United States Patent [19]
Shields

[11] 3,809,208
[45] May 7, 1974

[54] APPARATUS FOR ADVANCING ARTICLES RELATIVE TO FILLING AND SEALING DEVICES

[76] Inventor: Walter A. Shields, Jamaica, N.Y.

[22] Filed: June 12, 1972

[21] Appl. No.: 262,060

[52] U.S. Cl.................... 198/85, 198/24, 198/221
[51] Int. Cl............................................ B65g 37/00
[58] Field of Search........ 198/24, 85, 221, 222, 110, 198/111; 74/24, 53

[56] References Cited
UNITED STATES PATENTS

| | | | |
|---|---|---|---|
| 2,999,579 | 9/1961 | Kostrzewa | 198/221 X |
| 3,319,769 | 5/1967 | Krasinski | 198/85 |
| 2,459,524 | 1/1949 | Hanson | 198/221 X |
| 1,811,545 | 6/1931 | Goddard | 198/85 X |
| 3,221,781 | 12/1965 | Forsstrom | 198/85 X |
| 3,212,510 | 10/1965 | Blewett | 198/85 X |
| 1,609,802 | 12/1926 | Ekstrom et al. | 198/24 |
| 1,109,517 | 9/1914 | Delgoffe | 198/24 |

*Primary Examiner*—Evon C. Blunk
*Assistant Examiner*—Joseph E. Valenza

[57] ABSTRACT

The articles are intermittently advanced in two parallel rows and in opposite directions by separate first means simultaneously reciprocated in opposite directions and are transferred from the first row to the second row and from the second row to the first row by separate second means simultaneously reciprocated in opposite directions. The first means advancing the articles in each row before the second means transfer the leading article in each row to the other row to leave a space at the receiving end of each row to receive the article transferred by the second means.

5 Claims, 7 Drawing Figures

APPARATUS FOR ADVANCING ARTICLES RELATIVE TO FILLING AND SEALING DEVICES

The invention comprises a platform to support two rows of articles in a horizontal plane. The articles are intermittently advanced by a first pair of slides reciprocated at the receiving end and longitudinally of each row by a pair of cams under the influence of a spring connected to each slide. The slide in the initial row is actuated by its spring to advance the articles and the slide in the succeeding row is actuated by its cam to advance the articles. The advancing movement of each first pair of slides will leave a space at the receiving end of each row so that the leading article in each row can be transferred to the other row by a second pair of slides reciprocated transversely of the rows by a pair of cams and a pair of spring tensioned cables. A slide of the second pair of slides is actuated to transfer an article from the initial row to the succeeding row by its connected cam and spring tensioned cable will impart retrograde movement to said slide. The other slide of the second pair of slides is actuated to transfer an article from the succeeding row to the initial row by its spring tensioned cable and retrograde movement is imparted to said other slide by its cam.

In the drawings accompanying and forming a part of this application:

Figure 1:
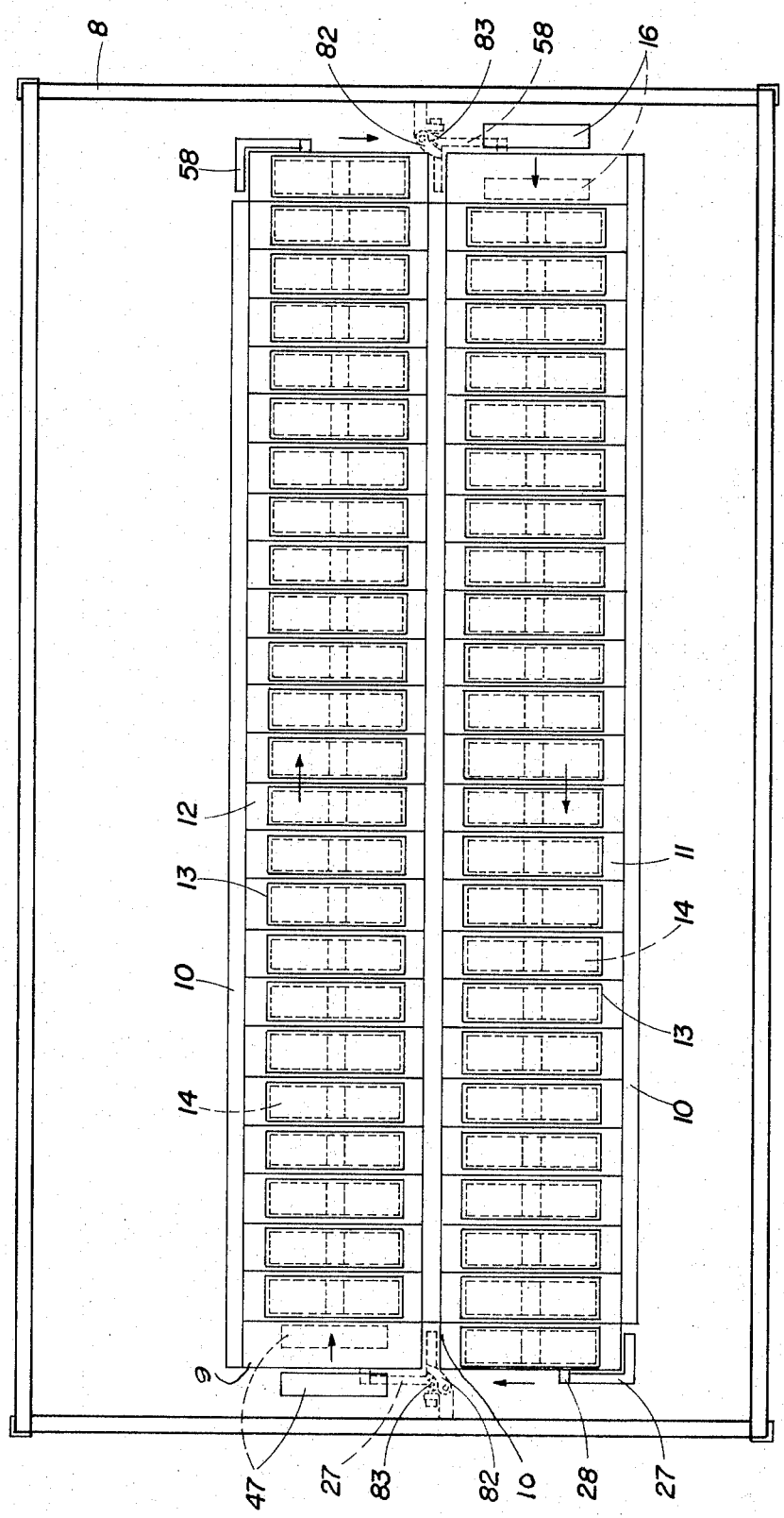
FIG. 1 is a top plan view of the apparatus.

The embodiment of the invention comprises a supporting frame 8 provided with a table top or platform 9 arranged with three rails 10 equidistantly spaced from each other and extended longitudinally of the platform 9 to form two parallel rows or lanes 11 and 12. The rows 11 and 12 are provided with carriers 13 to support articles 14. Empty articles 14 are manually positioned in the carriers 13 at the receiving end of row 11. In the present disclosure of the invention, there remains three empty carriers 13 in the receiving end of row 11 to receive empty articles.

Figure 2:
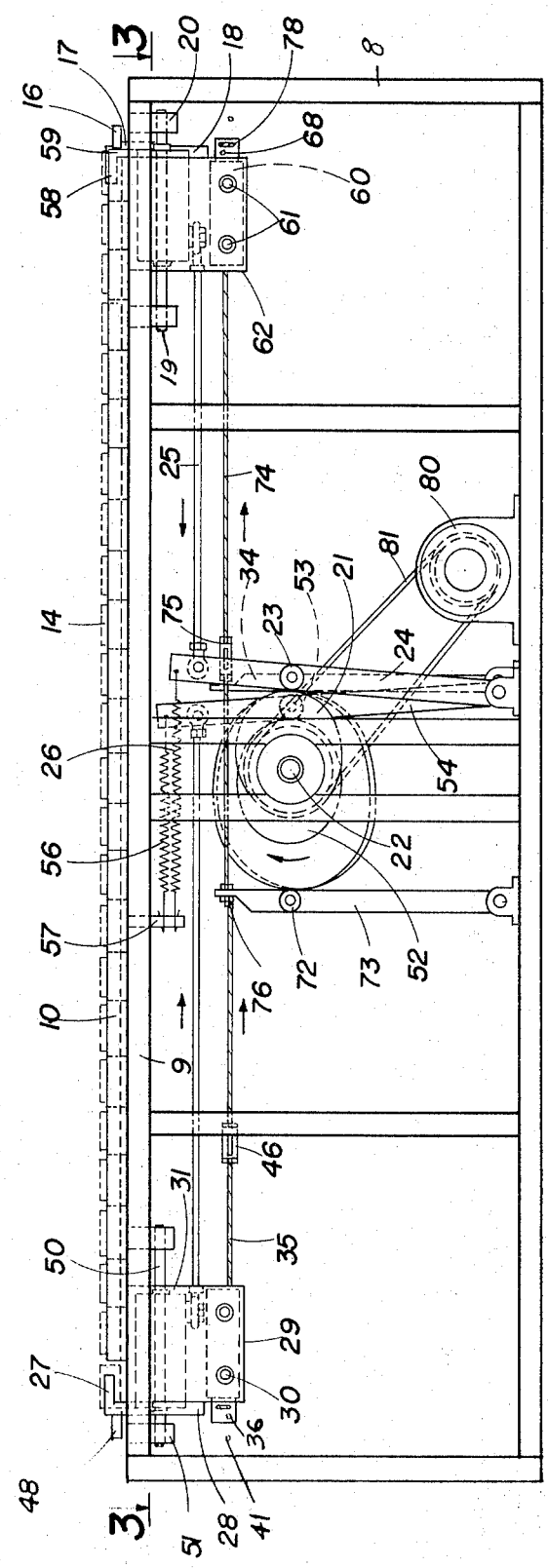
FIG. 2 is an elevational view looking at the bottom of FIG. 1.
Figure 3:
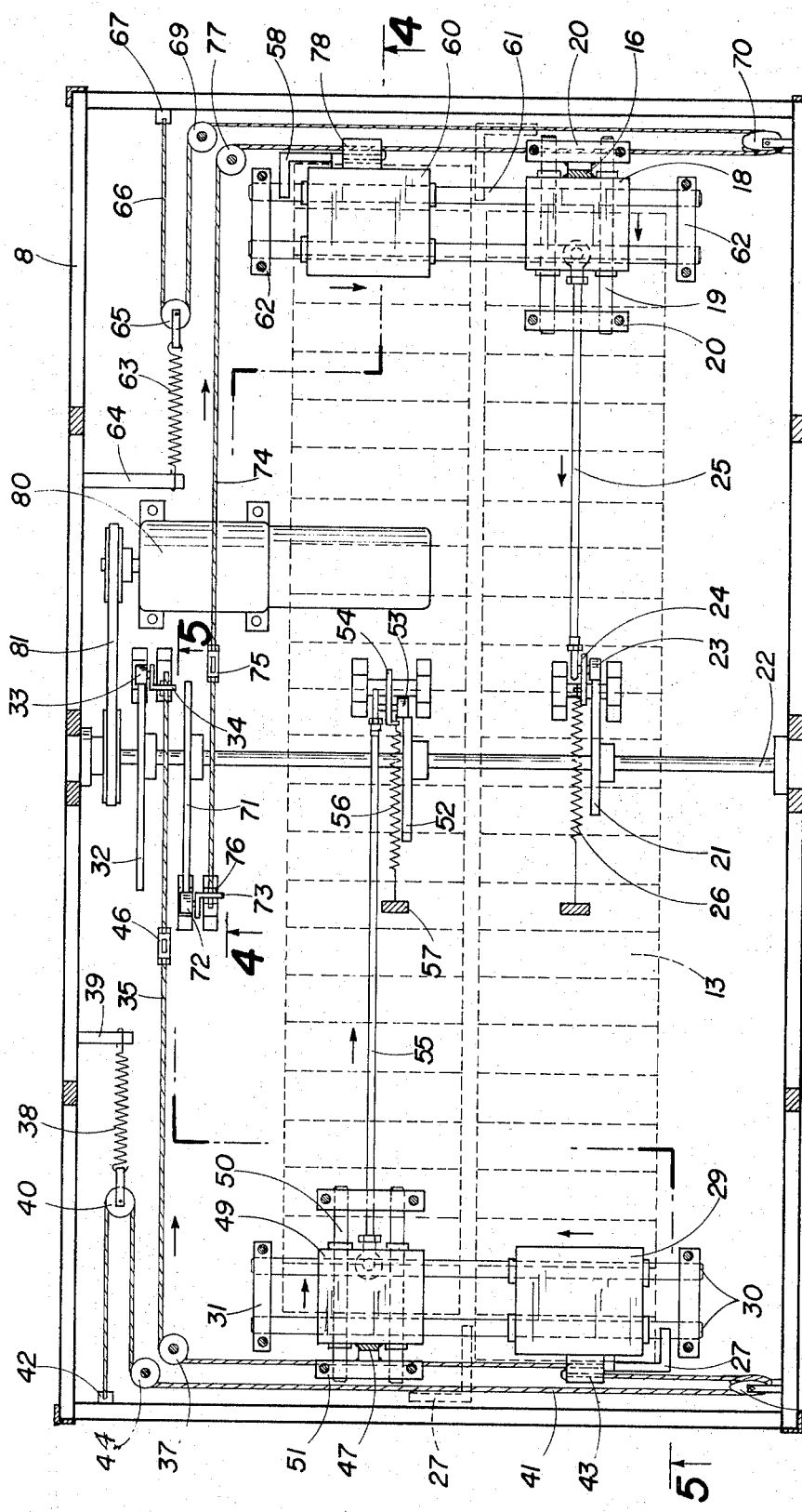
FIG. 3 is a plan view looking from line 3—3 of FIG. 2 in the direction of the arrows.
Figure 4:
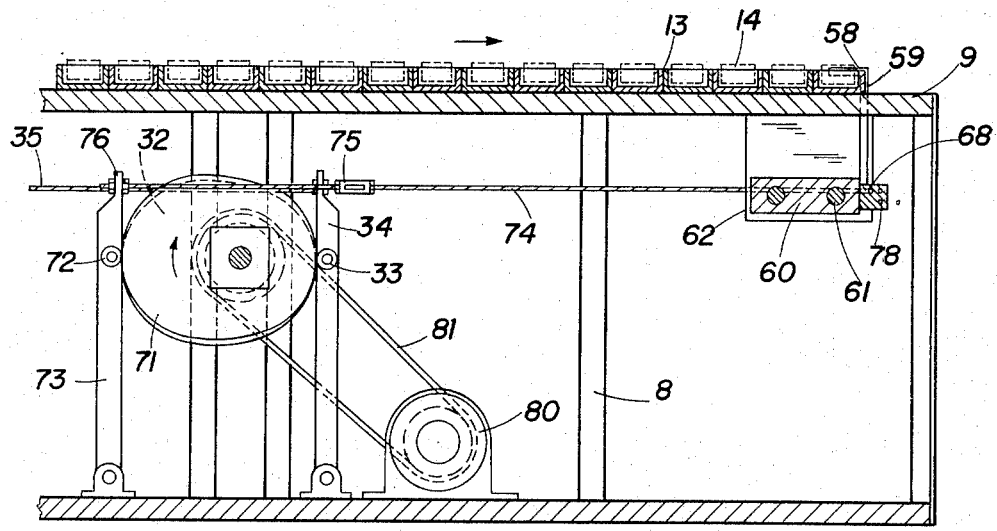
FIG. 4 is an elevational-sectional view looking from the line 4—4 of FIG. 3 in the direction of the arrows.
Figure 5:
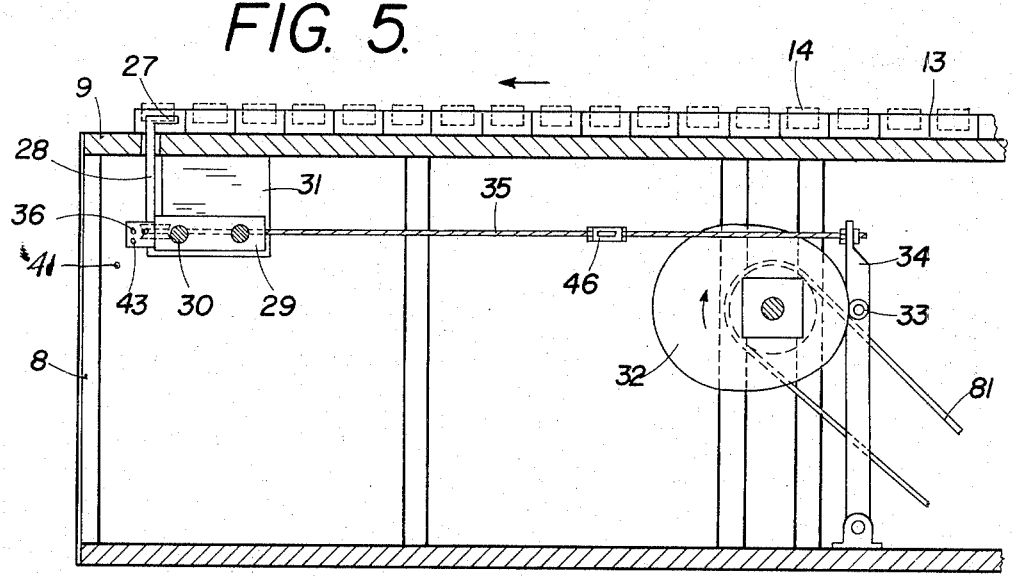
FIG. 5 is an elevational-sectional view looking from the line 5—5 of FIG. 3 in the direction of the arrows.
Figure 6:
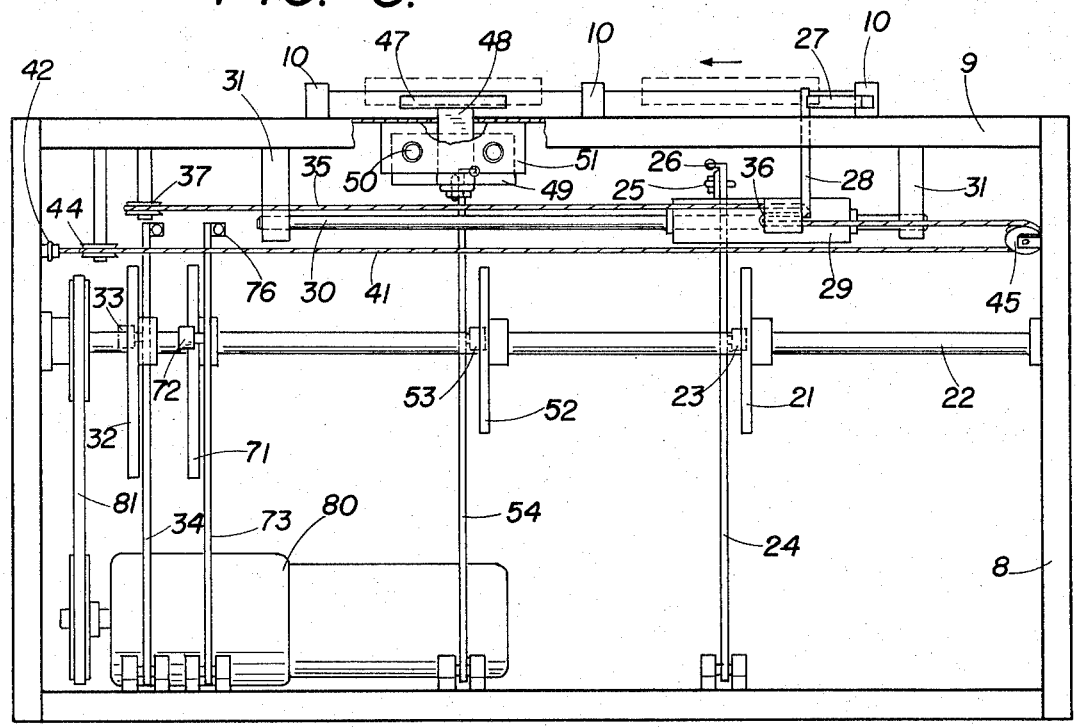
FIG. 6 is a side elevational view looking at the left hand side of FIG. 1.
Figure 7:
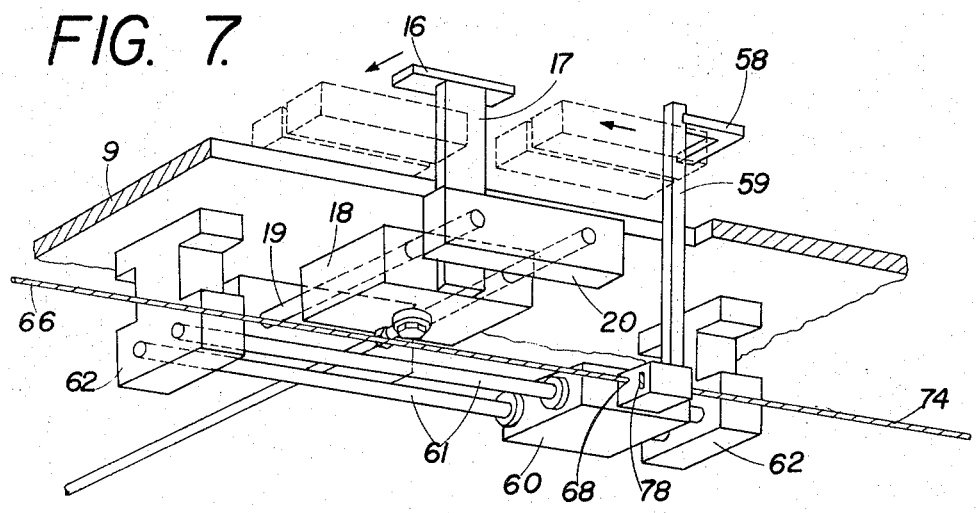
FIG. 7 is a perspective view of the slides for advancing the articles along the initial row and for transferring the articles from the succeeding row to the initial row.

The carriers 13 in row 11 are intermittently advanced by a pusher comprising a transverse member 16 carried by a post 17 secured to a slide 18 reciprocally mounted on a pair of parallel rods 19 secured at their opposite ends in brackets 20 mounted on the bottom of the platform 9, as shown in FIGS. 2, 3 and 7. Reciprocatory movement is imparted to the slide 18 by a cam disc 21 secured on a shaft 22 rotatably supported at its opposite ends by the frame 8. The cam disc 21 engages a roller 23 on an arm 24 pivotally supported by the frame 8 and connected to the slide 18 by a rod 25. The roller 23 is yieldingly urged into engagement with the cam disc 21 by a spring 26, as shown in FIGS. 2, 3 and 6.

In operation, the slide 18 is actuated to advance the carriers 13 in the row 11 by the contracting force of the spring 26 when the roller 23 is riding the low portion of the cam disc 21 and retrograde movement is imparted to the slide 18 by the roller 23 riding the high portion of the cam disc 21.

The empty articles 14 can be filled with desirable material by suitable filling devices, not shown, when they are in row 11.

The filled articles 14 are transferred from row 11 to row 12 by a pusher comprising an angle member 27 secured on a post 28 carried by a slide 29 reciprocally mounted on a pair of rods 30 suspended from the platform 9 by brackets 31, as shown in FIGS. 2, 3, 5 and 6. The slide 29 is reciprocated by a cam disc 32 secured on the shaft 22 to engage a roller 33 on an arm 34 pivotally mounted on the frame 8 and connected to the slide 29 by a cable 35 connected at one end to the arm 34 and the opposite end of the cable 35 is connected to the slide 29, as shown at 36 in FIG. 6. An intermediate portion of the cable 35 is guided and supported by a pulley 37 supported by the platform 9. The cam disc 32 will move the slide 29 to transfer the filled articles 14 from row 11 to row 12 by the roller 33 riding the high portion of the cam disc 32 and retrograde movement is imparted to the slide 29 by a spring 38 anchored at one end to the frame 8 by a post 39 and the opposite end of the spring 38 carries a pulley 40 engaged by a cable 41 anchored at one end to the frame 8, as at 42 in FIGS. 3 and 6, and the opposite end of the cable 41 is connected to the slide 29, as at 43. The portion of the cable 41 leading from the pulley 40 is guided and supported by a pulley 44 suspended from the platform 9 and the cable 41 is directed to the connection 43 by a pulley 45 supported by the frame 8. The cable 35 is provided with a turnbuckle 46 to maintain the cable 35 under proper tension.

The filled articles 14 in row 12 are intermittently advanced by a pusher comprising a transverse member 47 attached to a post 48 secured to a slide 49 reciprocally mounted on a pair of rods 50 fixed at the opposite ends in brackets 51 suspended from the platform 9. Article advancing movement is imparted to the slide 49 by a cam disc 52 secured on the shaft 22 to engage a roller 53 on an arm 54 pivotally supported by the frame 8 and connected to the slide 49 by a rod 55. The roller 53 is yieldingly urged into engagement with the cam disc 52 by a spring 56 anchored to a post 57 suspended from the platform 9. Retrograde movement is imparted to the slide 49 when the roller 53 rides on the low portion of the cam disc 52 by the spring 56.

The cam discs 32 and 52 are designed and mounted on the shaft 22 so that the slide 49 is in its retrograde position and the initial space in row 12 is empty when the slide 29 is actuated by the cam disc 32 to transfer the leading article 14 in row 11 to said empty initial space in row 12.

The articles 14 in row 12 may be sealed or closed by suitable mechanism, not shown.

The leading filled and closed article 14 in row 12 is transferred to the initial space in row 11 which will always be empty by the article advancing movement of the pusher member 16. This is accomplished by pusher mechanism comprising an angle member 58 on a post 59 attached to a slide 60 reciprocally mounted on a pair of rods 61 suspended from the platform 9 by brackets 62. The slide 60 is reciprocated to transfer said filled and closed article 14 by a spring 63 anchored by a post 64 to the frame 8 and carrying a pulley 65 engaged by a cable 66 anchored at one end to the frame 8, as at 67 in FIG. 3. The opposite end of the cable 66 is attached to the slide 60, as at 68 in FIGS. 2, 3, 4 and 7, with the cable 66 being guided and supported by a pulley 69 after it leaves the pulley 65 and by a pulley 70 before it is attached to the slide 60, as shown in FIG. 3. The pulley 69 is supported by the platform 9 and the pulley 70 is supported by the frame 8.

Retrograde movement is imparted to the slide 60 by a cam disc 71 secured on the shaft 22 and engaged by a roller 72 on an arm 73 pivotally supported by the frame 8 and connected to the slide 60 by a cable 74 provided with a turnbuckle 75 to maintain said cable taut. One end of the cable 74 is attached to the upper end of the arm 73, as shown at 76, and extended from the turnbuckle 75 around a pulley 77 supported by the platform 9 with the opposite end of the cable 74 attached to the slide 60, as at 78 in FIGS. 2, 3, 4 and 7.

The filled and closed articles 14 transferred from row 12 to row 11 is advanced along row 11 by the pusher 16 to a position where it is manually removed from its carrier 13.

The shaft 22 and its cam discs 21, 32, 52 and 71 are continuously rotated by an electric motor 80 supported by the frame 8 and connected to the shaft 22 by a belt 81.

To slow down the transferring movement of the carriers 13 by the pushers 27 and 58, there is provided a latch-brake 82 pivotally mounted on the frame 8 and yieldingly urged by a spring 83, as shown in FIG. 1, to engage the side of the carriers 13 being transferred by the pushers 27 and 58. The latch-brake 82 also holds the carriers 13 in their transferred position to be subsequently engaged by the pushers 16 and 47.

Having thus described my invention, I claim:

1. In apparatus for advancing articles relative to filling and sealing devices, a platform divided into two parallel rows, each row having a receiving and discharge end, abutting carriers supported by the platform in said parallel rows, a pusher of a first pair of pushers reciprocally mounted at a receiving end of each row, means to simultaneously reciprocate the first pair of pushers longitudinally of the rows and advance the carrier toward a discharge end of each row comprising a pair of rotatably supported cam discs, an arm pivotally mounted and connected to each of the first pair of pushers, a roller carried by each arm relative to each cam disc and a spring connected to each arm to maintain contact between each roller and its associated cam disc, one of the springs actuating one of the pushers of the first pair of pushers to advance the carriers by said spring the roller engages the low of the cam disc associated with said spring, and the other cam disc actuating the other pusher of the first pair of pushers when the high of said cam disc engages its associated roller, a pusher of a second pair of pushers reciprocally mounted transversely of the ends of each row, and means to simultaneously reciprocate the second pair of pushers to transfer the leading carrier in each row to the receiving end of each row comprising a pair of rotatably supported cam discs, a pair of arms pivotally mounted, a roller rotatably mounted on each arm to engage each cam disc, a cable connecting each arm to a pusher of the second pair of pushers, and a pair of cables, each of said pair of cables being anchored at one end and the opposite end connected to each pusher of the second pair of pushers, and a spring anchored at one end and the other end connected to an intermediate portion of each cable of the pair of cables.

2. Apparatus for advancing articles relative to filling and sealing devices as claimed in claim 1, wherein one of the pushers of the second pair of pushers is actuated by its associated cam disc to transfer the leading carrier from the discharge end of one row to the receiving end of the other row and retrograde movement is imparted to said pusher by its associated cable of the pair of cables.

3. Apparatus for advancing articles relative to filling and sealing devices as claimed in claim 1, wherein the other pusher of the second pair of pushers is actuated to transfer the leading carrier from the discharge end of the other row to the receiving end of the first row by its associated cable of the pair of cables and retrograde movement is imparted to said pusher by the cam disc.

4. Apparaus for advancing articles relative to filling and sealing devices as claimed in claim 1, wherein the means to simultaneously reciprocate the first and second pairs of pushers includes a rotatable shaft, motive means connected to and continuously rotating said shaft, and cam discs fixedly mounted on the shaft and each cam disc associated with a pusher.

5. In apparatus for advancing articles relative to filling and sealing devices as claimed in claim 1, a latch-brake pivotally supported adjacent to the path of the carriers being transferred by the second pair of pushers, and a spring yieldingly urging each latch-brake to engage the side of the carriers being transferred by the second pair of pushers to slow down said transferring movement of the carriers and hold said transferred carriers to be engaged by the first pair of pushers.

* * * * *